United States Patent
Soldate

(10) Patent No.: US 8,972,285 B2
(45) Date of Patent: Mar. 3, 2015

(54) SYSTEM AND METHOD FOR DETERMINING INVENTORY LOCATIONS

(71) Applicant: Wal-Mart Stores, Inc., Bentonville, AR (US)

(72) Inventor: David Soldate, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 101 days.

(21) Appl. No.: 13/757,294

(22) Filed: Feb. 1, 2013

(65) Prior Publication Data

US 2014/0222601 A1   Aug. 7, 2014

(51) Int. Cl.
*G06G 1/14* (2006.01)
*G06Q 20/00* (2012.01)
*G06Q 10/08* (2012.01)

(52) U.S. Cl.
CPC ................................ *G06Q 10/087* (2013.01)
USPC .......................................................... 705/22

(58) Field of Classification Search
None
See application file for complete search history.

(56) References Cited

U.S. PATENT DOCUMENTS

| | | | |
|---|---|---|---|
| 2005/0027443 A1* | 2/2005 | Cato | 701/207 |
| 2008/0071649 A1 | 3/2008 | Dunst et al. | |
| 2008/0120206 A1 | 5/2008 | Weiler et al. | |
| 2010/0138281 A1* | 6/2010 | Zhang et al. | 705/10 |
| 2011/0153614 A1 | 6/2011 | Solomon | |

FOREIGN PATENT DOCUMENTS

| | | |
|---|---|---|
| KR | 1020090054501 | 6/2009 |
| WO | 2004017156 | 2/2004 |

OTHER PUBLICATIONS

International Search Report and Written Opinion for PCT/US2014/014159 (Mailed May 27, 2014).

* cited by examiner

*Primary Examiner* — Paul Danneman
(74) *Attorney, Agent, or Firm* — Kutak Rock LLP; Bryan P. Stanley

(57) ABSTRACT

A system and method for determining a specific location in a brick and mortar retail store from which an item purchased by a customer in the store was likely obtained, so as to enable maintenance of inventory at the location level within the store is provided. The system includes a central database in which information regarding product inventory for a brick and mortar store location is maintained, a point of sale client capable of obtaining a product identifier from items being purchased by a customer, and a product location mechanism that utilizes the product identifier obtained by the point of sale client for the items being purchased by the customer, and other information from the point of sale client and/or from within the database to determine the most likely location from which an item was obtained by the customer and decrement the inventory unit amount stored in the database for the location by the number of such items purchased.

17 Claims, 1 Drawing Sheet

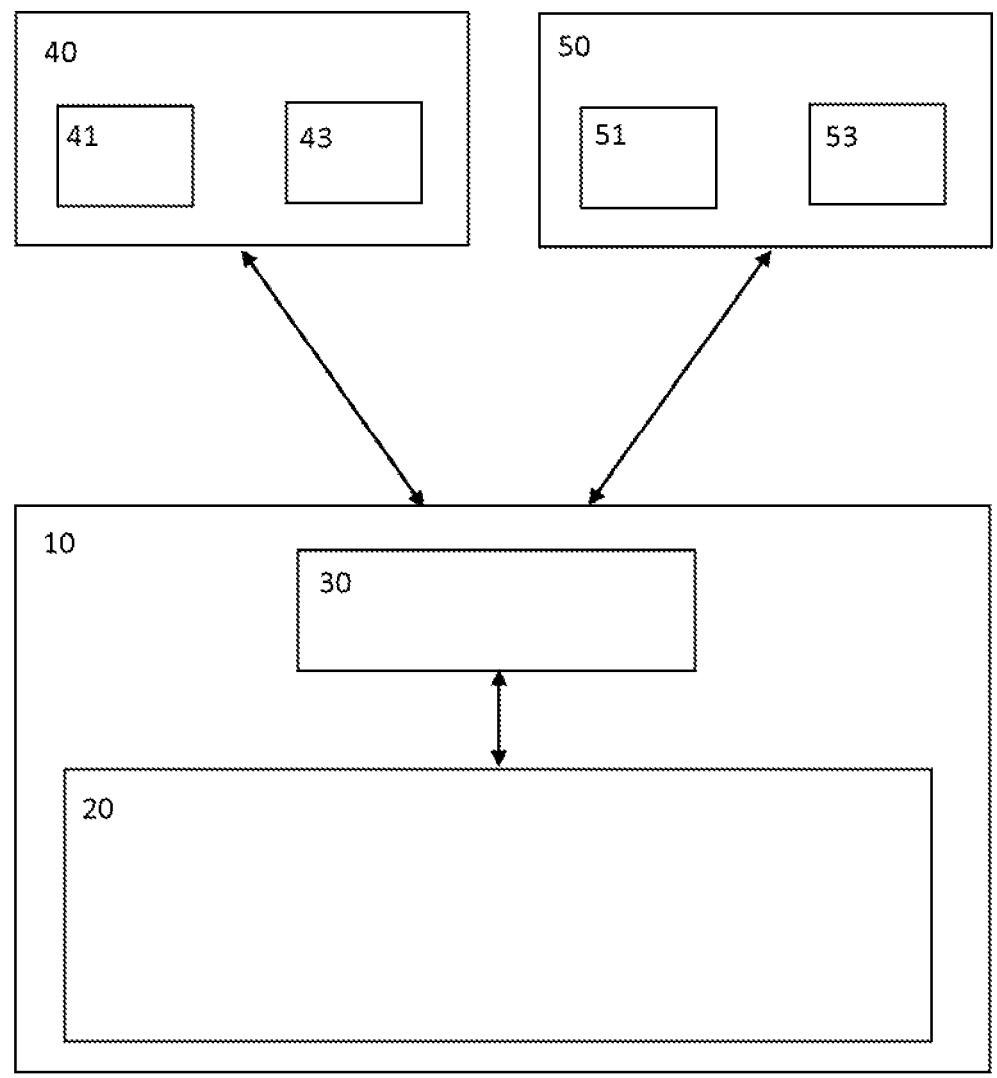

SYSTEM AND METHOD FOR DETERMINING INVENTORY LOCATIONS

FIELD OF THE INVENTION

The present inventive concept relates generally to inventory management. More specifically, the present inventive concept is concerned with a system and method for determining a specific location in a brick and mortar retail store from which an item purchased by a customer in the store was likely obtained, so as to enable maintenance of inventory at the location level within the store.

BACKGROUND OF THE INVENTION

Many brick and mortar retailers will have one primary location and one or more secondary location(s) where they position the same type of product for purchase by customers. Multiple product locations are leveraged not only for shopping convenience, but also to increase potential sales. One of the classic examples of type of product that has multiple locations within a store (a "multiple-locational product") is batteries, which can be found in several areas of a store. For example, a primary location for batteries is usually in or near the electronics department of many stores. While, at the same time, batteries will be positioned at a number of secondary locations throughout the store, such as at the end of toy aisles in which toys that require batteries are located, and near the costumer checkout point of sale (POS) registers.

In many store systems, store inventory or perpetual inventory, is maintained at the SKU (stock-keeping unit) level maintaining a total count of inventory within the store. As product is received, this inventory is increased and as it is sold it is then decreased. To improve productivity of store associates as well as to provide a foundation for store pick and ship operations, a more accurate method of maintaining store inventory is desirable in which inventory is maintained at the location level itself.

The difficulty in maintaining inventory at the location level is that it is not the associates that work in the store that pull inventory from the shelf, but rather it is the customer. In a traditional retail operation, the shopping experience is manual and it is not until the customer goes through the checkout process that the inventory management systems within the store know (i.e. obtain data sufficient to determine) that inventory should be decremented.

Even with a mobile shopping cart, most of these systems only require the customer to scan the product and not the location. Therefore, while conventional systems know that inventory needs to be decremented at the SKU level, the inventory management system does not know which location needs to be decremented.

SUMMARY OF THE INVENTION

The present invention comprises a system and method for determining a specific location in a brick and mortar retail store from which an item purchased by a customer in the store was likely obtained, so as to enable maintenance of inventory at the location level within the store. The system of the inventive concept includes a central database (such as a server-based database) in which information regarding product inventory for a brick and mortar store location is maintained, a point of sale client capable of obtaining a product identifier (such as a SKU) from items being purchased by a customer, and a product location mechanism that utilizes the product identifier obtained by the point of sale client for the items being purchased by the customer, and other information from the point of sale client and/or from within the database to determine the most likely location from which an item was obtained by the customer and decrement the inventory unit by the number of such items purchased from the inventory unit of the determined location stored in the database.

Information stored in the database includes a unique product identifier (such as a SKU) for each product that is in inventory at the store location, as well as coordinates for a primary product location and any secondary product locations in which each product is located within the store. The database includes a unique location identifier for each product location associated with the location coordinates. The database also includes an inventory unit associated with each primary and secondary product location, which represents a quantity of items of the product that are located at each product location. In some embodiments, the database also includes a dependent product field that associates the unique product identifier of a multiple-locational product with unique product identifiers of one or more products that are typically purchased by a customer along with said multiple-locational product.

In some embodiments, the product location mechanism accesses said database and determines whether an item is a multiple-locational product utilizing said primary product location and any secondary product location associated with said item, if said item is a multiple-locational product, the product location mechanism determines a most-likely product location from which said item was obtained by said customer from said primary and secondary product locations, and decrements said inventory unit of said determined product location by a value equal to said quantity of said item obtained from said point of sale client, and if said item is not a multiple-locational product, the product location mechanism decrements said inventory unit of said primary product location by a value equal to said quantity of said item obtained from said point of sale client.

In some embodiments of the invention a point of sale client includes a point of sale client location coordinates. The location coordinates may be stored in a memory or other storage media of or accessible by the point of sale client, or may be stored centrally in the database accessible and for utilization by the product location mechanism. In some such embodiments said point of sale client comprises a mobile shopping cart on a mobile computer device carried by said customer while shopping at said store. In one such embodiment said point of sale client location coordinates are obtained from said mobile computer device generally simultaneously as said product identifier from and said quantity for each item being purchased by said customer are obtained. In one embodiment in which the point of sale client location coordinates are obtained from said mobile computer device generally simultaneously as said product identifier from and said quantity for each item being purchased by said customer are obtained, the point of sale client location coordinates are stored (in a database or in memory) for later use by the product location mechanism. In one such embodiment, the product location mechanism determines the most-likely product location for a multi-locational product at checkout.

In other embodiments said point of sale client comprises a fixed location checkout register at said store.

In some embodiments said product location mechanism utilizes said point of sale client location coordinates to calculate a distance between said point of sale client location coordinates and said primary product location coordinates and between said point of sale client location coordinates and any secondary product location coordinates for each item being purchased by said customer and identifies a product location coordinates from said primary location coordinates and said any secondary product location coordinates that is a shortest distance from said point of sale client location coordinates. In one such embodiment said product location mechanism assigns a product location identifier for said identified product location coordinates as said determined product location. In another such embodiment said product location mechanism compares said shortest distance identified between said point of sale client location coordinates and said product location coordinates for a multiple-locational item with a shortest distance calculated between said product location coordinates of said multiple-locational item and product location coordinates of all other items being purchased by said customer to identify a product location coordinates for said multiple-locational item that are a shortest distance from an assumed path of said customer through said store. In one embodiment said product location mechanism assigns as said determined product location a product location identifier for said product location coordinates identified as said shortest distance from said assumed path of said customer.

In other embodiments said database includes a dependent product field that associates the unique product identifier of a multiple-locational product with unique product identifiers of one or more products that are typically purchased by a customer along with said multiple-locational product. In some such embodiments said product location mechanism utilizes said dependent product field to determine if any items purchased by said customer are included as dependent products for a multiple-locational product item also being purchased by said customer. In some embodiments said product location mechanism utilizes product location coordinates of said determined dependent products to calculate a distance between said product location coordinates of said determined dependent product and said primary product location coordinates and between said product location coordinates of said determined dependent product and secondary product location coordinates for each multiple-locational item being purchased by said customer and identifies a product location coordinates from said primary location coordinates and said any secondary product location coordinates that is a shortest distance from any product location coordinates of said determined dependent product. In one embodiment said product location mechanism assigns a product location identifier for said identified product location coordinates as said determined product location. In one embodiment said point of sale client includes a point of sale client location coordinates and said product location mechanism utilizes said point of sale client location coordinates to help determine said determined product location if said product location mechanism determines that no items purchased by said customer are included as dependent products for a multiple-locational product item also being purchased by said customer. In still another embodiment said product location mechanism utilizes said point of sale client location coordinates to calculate a distance between said point of sale client location coordinates and said primary product location coordinates and between said point of sale client location coordinates and any secondary product location coordinates for each item being purchased by said customer and identifies a product location coordinates from said primary location coordinates and said any secondary product location coordinates that is a shortest distance from said point of sale client location coordinates. In another embodiment said product location mechanism compares said shortest distance identified between said point of sale client location coordinates and said product location coordinates for a multiple-locational item with a shortest distance calculated between said product location coordinates of said multiple-locational item and product location coordinates of all other items being purchased by said customer to identify a product location coordinates for said multiple-locational item that are a shortest distance from an assumed path of said customer through said store. In another embodiment said product location mechanism assigns as said determined product location a product location identifier for said product location coordinates identified as said shortest distance from said assumed path of said customer.

In another embodiment said product location mechanism is included in or accessed by said point of sale client. The product location mechanism may be part of a mobile shopping cart or part of an in-store register/POS check out system software.

In another embodiment said product location mechanism is included in or accessed by a management system that is in communication with said point of sale client.

In an embodiment of a method of determining inventory location of the instant invention, the method comprises the steps of: storing a unique product identifier for each of a plurality of products sold within a brick and mortar-type retail store in a database; storing in said database in association with said product identifier for each product a primary product location within said store for each product, each primary product location including a unique location identifier and location coordinates; storing is said database in association with said product identifier for a multiple locational product from said plurality of products at least one secondary product location for said multiple-locational product, said secondary product location including a unique location identifier and location coordinates; storing in said database an inventory unit associated with each primary and secondary product location and stored in said database, wherein said inventory unit represents a quantity of items of a product at each product location; obtaining from a point of sale client said product identifier from and a quantity for each of one or more items being purchased by a customer from said plurality of products at said store; and utilizing said product identifier from said one or more items being purchased by said customer to: access said database and determine whether an item is a multiple-locational product utilizing said primary product location and any secondary product location associated with said item, if said item is a multiple-locational product, determining a most-likely product location from which said item was obtained by said customer from said primary and secondary product locations, and decrementing said inventory unit of said determined product location by a value equal to said quantity of said item obtained from said point of sale client, and if said item is not a multiple-locational product, decrementing said inventory unit of said primary product location by a value equal to said quantity of said item obtained from said point of sale client.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 1 is schematic diagram of a system of an embodiment of the inventive concept.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1 a schematic diagram of an embodiment of the instant inventive concept is shown including a central inventory management system 10 for a brick and mortar retail location, a database 20 accessible by the inventory management system, a product location mechanism 30 that (in the embodiment shown) is a computer program or subprogram of the inventory management system 10, and point of sale (POS) clients 40 and 50 that communicate with and/or are operably connected to inventory management system 10 and each include input devices 41 and 51 and location identifiers 43 and 53, respectively. The computer program/subprogram of the product location mechanism 30 accesses the database described further below and performs the operations described further below to calculate and/or determine the location in a brick and mortar retail store from which an item purchased by a customer in the store was likely obtained, so as to enable maintenance of inventory at the location level within the store.

In the embodiment shown in FIG. 1, inventory management system 10 is a computer program operating on a server that is a computing platform that includes a processing entity such as a CPU that executes software and provides the core system functionality of the inventory management system 10 and product location mechanism 30. In addition, the server may provide other functionality important to store operations such as employee schedule management, etc. The server and its CPU are in electronic communication with all of the described databases, as well as other systems utilized by the store. The software utilized by the system is encoded on a machine readable storage medium in the server. The software is executed by the CPU. The execution of the software of the product location mechanism 30 in one embodiment is initiated automatically pursuant to a rules engine encoded within the software when a customer initiates a purchase transaction (i.e. at checkout).

In some embodiments, the server for the inventory management system 10 is located at the brick and mortar store location. In other embodiments, the server is located remote from the brick and mortar store location, such as at centralized home office for multiple store locations. In some embodiments, the database 20, or portions thereof are located at a centralized location that is accessible from multiple store locations.

In the embodiment shown in FIG. 1, database 20 is shown as a single database that includes multiple data fields and which is part of inventory management system 10. Nevertheless, it will be appreciated that in other embodiments, database 20 will include multiple separate databases that are part of the inventory management system, or in some embodiments, multiple databases that are part of other system components and/or that stand alone from all system components. Furthermore, it will be appreciated that in some embodiments, the product location mechanism 30 is a separate, stand-alone computer program from other components of the inventive system. In the embodiment shown in FIG. 1, the product location mechanism 30 is part of a more robust inventory management system, while in other embodiments, the product location mechanism itself operates as the invention management system to access database 20 and utilize and/or communicate with one or more input devices. In the embodiment shown in FIG. 1, the inventory management system includes one or more other inputs that are not shown in FIG. 1. For example, inventory management system 10 includes an input via a portable computing device that is utilized by store management during initial set up of a store and/or during physical inventory counts at the store. The portable computing device is utilized to populate and/or update information in database 20.

In the embodiment shown in FIG. 1, database 20 includes, among other information, a unique product identifier (such as a SKU) for each product that is in inventory at the store, as well as coordinates for a primary product location and any secondary product locations in which each product is located within the store. Database 20 includes a unique location identifier for each product location associated with the location coordinates. Database 20 also includes an inventory unit associated with each primary and secondary product location, which represents a quantity of items of the product that are located at each product location. In the embodiment shown and described in connection with FIG. 1, the database 20 also includes a dependent product field that associates the unique product identifier of a multiple-locational product with unique product identifiers of one or more products that are typically purchased by a customer along with said multiple-locational product.

In the embodiment shown in FIG. 1, input device 40 is a checkout register or kiosk that is located at a generally fixed/static location at the store. Register 40 includes one or more input devices 41, such as a bar code scanner and keypad for inputting the product identifier of items being purchased by a consumer into the register along with the quantity of such items. Register 40 also includes a unique register location identifier 43 that is associated with specific coordinates in the database for the location of the register within the store. In an alternative embodiment, the register location identifier itself contains the specific coordinates for the location of the register. The register 40 is in communication (e.g. via a network, telephone or other data connection) with the inventory management system 10 to transmit the register location identifier, product identifiers and quantities of items purchased to the inventory management system 10. The product location mechanism 30 of the inventory management system then utilizes the information obtained from the register 40 in the manner discussed below to decrement the appropriate inventory unit(s).

In the embodiment shown in FIG. 1, input device 50 is a mobile computer device carried by the customer while shopping at the store and that runs a mobile shopping cart program. Mobile device 50 includes one or more input devices 51, such as a camera (which utilizes software on the device to function as a bar code scanner) and keypad for inputting the product identifier of items being purchased by a consumer into the mobile shopping cart program along with the quantity of such items. Mobile device 50 also includes location identifier 43 that provides the specific coordinates of the mobile device within the store. The coordinates can be generated by a GPS or other location generation system (such as cellular triangulation) protocol operating on the mobile device 50. The mobile device 50 is in communication (e.g. via a wifi network communication, cellular or other data connection) with the inventory management system 10 to transmit the mobile device location identifier, product identifiers and quantities of items purchased to the inventory management system 10. The product location mechanism 30 of the inventory management system then utilizes the information obtained from the mobile device 50 in the manner discussed below to decrement the appropriate inventory unit(s).

The product location mechanism 30 of the invention shown in FIG. 1 includes an algorithm either based upon the information from the mobile device 50, leveraging the items purchased by the customer in the customer's basket (either mobile basket if using mobile device 50 or physical basket if using register 40), or a combination of both, to determine the most likely location from which to decrement inventory in database 20. This algorithm can be called from and/or included as part of the mobile shopping cart, by the POS check out system software, or by the inventory management system.

Before the algorithm of the product location mechanism 30 of FIG. 1 is applied/utilized, inventory is maintained within specific locations in the store. Each inventory location is assigned a unique location ID as well as coordinate points using either a geographic or Cartesian methodology or both, which are stored in database 20. In addition, the dependent product field is populated to associate the unique product identifier of any multiple-locational products with unique product identifiers of one or more products that are typically purchased by a customer along with said multiple-locational products.

Each product can have one or more inventory units stored in database 20. An inventory unit is a means of being able to associate a product with an inventory location and quantity.

Each of the registers will also be assigned either a geographic or Cartesian location associated to them and stored in the database.

Many mobile operating systems, such as Android or iOS, provide the means of determining the geographical coordinates of the device. This geographical information is obtained by the shopping cart software on the mobile device 50. As the customer scans items into their shopping cart, the shopping cart software leverages these coordinates to determine which product inventory location should be decremented in the database 20. It will be appreciated that the location information of mobile device 50 as well as items scanned by the customer may be stored in one or more fields in database 20, or in another separate database that is part of and/or accessible by mobile device 50, so that such information may be utilized later by the mobile device, an inventory management system and/or the product location mechanism 30.

In embodiments in which a mobile shopping cart on a mobile device 50 is used, inventory locations will be defined in one embodiment within a geographical coordinate system. The Cartesian system may also be leveraged in this embodiment, but only after the calculations are completed and the correct inventory location has been determined.

To determine which inventory location will need to be decremented, then the algorithm of the product location mechanism 30 leverages the Haversine formula to calculate the distance from the point the mobile device is located at and the Geographic coordinates for each inventory location for that product. The Haversine Formula is defined:

$$\text{distance } (\phi, \lambda) = 2r \arcsin\left(\sqrt{\sin^2\left(\frac{\Delta\phi}{2}\right) + \cos(\phi_1)\cos(\phi_2)\sin^2\left(\frac{\Delta\lambda}{2}\right)}\right)$$

with r representing the radius of the Earth or 6,371 km, $\phi$ representing the set of latitude and $\lambda$ representing the set of longitude; both in radians. For consistency with discussion of later formula's herein, the formula is simplified to be distance (x,y) with x and y representing the set of coordinates in radians.

If CL represents the customer coordinates (of the mobile device 50 at the time a particular item is being scanned) and PI represents the coordinates for all of the possible inventory locations that a particular product can be found (stored in database 20), then the product location mechanism 30 will use the following formula.

$$\text{minimum}(\{\text{distance}(\{x_{PI_i}, x_{CL}\}, \{y_{PI_i}, y_{CL}\}); \text{i is an integer; and } 0 \geq i \leq n\}).$$

The minimum distance should provide the product location mechanism 30 the likely inventory location that was used and this inventory location can then be leveraged later by either the POS client system or the inventory management system and/or the product location mechanism 30 to decrement the inventory unit from the determined inventory location.

In embodiments in which a point of sale register 40 approach is utilized, inventory locations are determined through a different methodology, as where the shopper picked the item has to be inferred rather than directly calculated. The product location mechanism 30 of the instant invention leverages the items within the customer's basket to determine which Inventory Unit should be decremented.

If a geographical coordinate system is being used, then the distance will be calculated using the Haversine formula as defined earlier.

If a Cartesian coordinate system is being used then the Euclidean distance is calculated through the following formula: $\text{distance}(a,b)=\sqrt{\sum_{i=1}^{n}(a_i-b_i)^2}$ with a and b representing the set of coordinates in Euclidean space.

For purposes of discussing either formula, the product location mechanism 30 of the inventive system will use the consistent functional definition of distance(x, y), with x and y representing the set of coordinates.

Regarding the general methodology of the inventive concept, there generally are two approaches that can be taken in embodiments in which a point of sale register 40 approach is utilized.

One approach is to take advantage of knowing item dependencies. An example would be a clock that requires batteries. If a customer purchases the clock, then more than likely they will also purchase batteries and typically will do so closest to where they picked up the clock. Such item dependencies are stored in connection with each multiple-locational item in database 20 and accessible by product location mechanism 30.

The other approach is to leverage the contents of the basket. Many customers will purchase products based upon convenience. If a product has multiple locations, then more than likely the customer picked up the product that was closest to where they were shopping or the closest to the register that they check out of.

Regardless of which register 40 approach the product location mechanism 30 of the inventive system uses, the inventory location that has the minimum distance will be the one chosen by the product location mechanism 30 to be updated/decremented. Furthermore, it will be appreciated either approach discussed herein will be utilized in some embodiments in combination with one another and alternatively in other embodiments will be utilized individually.

If the customer's basket at register 40 contains items that have multiple inventory locations as well as one or more dependent products, then the product location mechanism 30 will use this information to determine the most likely inventory location that the customer obtained the product.

To determine the most likely inventory location which will need to be decremented, the product location mechanism 30 will calculate the distances between all of the inventory locations for the original product to each of the dependent products. For the following formula, PD represents the coordinates for the dependent product and PO represents the coordinates for the original product:

$$\text{minimum}(\{\text{distance}(\{x_{PD_i}, x_{PO_j}\}, \{y_{PD_i}, y_{PO_j}\}): i \text{ and } j \text{ are integers},$$
$$\text{and } 0 \geq i \leq PD_n; \text{ and } 0 \geq j \leq PO_n\})$$

If the customer's basket at register 40 contains products that have multiple inventory locations but do not have dependencies, then the product location mechanism 30 will determine which inventory location to decrement based upon the location of the register as well as the entire contents of the customer's basket during checkout at register 40.

For purposes of discussing this algorithm component of the product location mechanism 30, PO represents the product/item that has multiple locations, PB represents an item in the basket excluding the original item and RG represents the register. Products within the customer's basket may have multiple inventory locations which will be included in the calculation performed by the product location mechanism 30. The formula:

$$\text{minimum}(\{\text{distance}(\{x_{PO_i}, x_{PB_j}\}, \{y_{PO_i}, y_{PB_j}\}): i \text{ and } j \text{ are integers},$$
$$\text{and } 0 \geq i \leq PO_n; \text{ and } 0 \geq j \leq PB_n\} \cup$$
$$\{\text{distance}(\{x_{PO_i}, x_{RG}\}, \{y_{PO_i}, y_{RG}\}): i \text{ is an integer, and } 0 \geq i \leq PO_n\})$$

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A system for determining inventory location comprising:
   a unique product identifier associated with each of a plurality of products sold within a brick and mortar-type retail store, wherein said product identifier associated with each product is stored in a database;
   a primary product location within said store associated with each product, each primary product location including a unique location identifier and location coordinates, wherein said location identifier and location coordinates are stored in said database in association with said product identifier for each product;
   at least one secondary product location associated with a multiple-locational product from said plurality of products, said secondary product location including a unique location identifier and location coordinates that are stored in said database in association with said product identifier associated with said multiple locational product;
   an inventory unit associated with each primary and secondary product location and stored in said database, wherein said inventory unit represents a quantity of items of a product at each product location; and
   a point of sale client that includes a processor and that obtains said product identifier from and a quantity of each of one or more items being purchased by a customer from said plurality of products at said store; and
   a product location mechanism associated with said point of sale client that utilizes said product identifier obtained by said point of sale client associated with said one or more items being purchased by said customer to:
      access said database and determine whether an item is a multiple-locational product utilizing said primary product location and any secondary product location associated with said item,
      if said item is a multiple-locational product, determine a most-likely product location from which said item was obtained by said customer from said primary and secondary product locations, and decrement said inventory unit of said determined product location by a value equal to said quantity of said item obtained from said point of sale client, and
      if said item is not a multiple-locational product, decrement said inventory unit of said primary product location by a value equal to said quantity of said item obtained from said point of sale client;
      wherein said point of sale client includes a point of sale client location coordinates; and
      wherein said product location mechanism utilizes said point of sale client location coordinates and calculates a distance between said point of sale client location coordinates and said primary product location coordinates and between said point of sale client location coordinates and any secondary product location coordinates associated with each item being purchased by said customer and identifies a product location coordinates from said primary location coordinates and said any secondary product location coordinates that is a shortest distance from said point of sale client location coordinates.

2. The system for determining inventory location as claimed in claim 1 wherein said point of sale client comprises a mobile shopping cart on a mobile computer device carried by said customer while shopping at said store.

3. The system for determining inventory location as claimed in claim 2 wherein said point of sale client location coordinates are obtained from said mobile computer device generally simultaneously as said product identifier from and said quantity for each item being purchased by said customer are obtained.

4. The system for determining inventory location as claimed in claim 1 wherein said point of sale client comprises a fixed location checkout register at said store.

5. The system for determining inventory location as claimed in claim 1 wherein said product location mechanism assigns a product location identifier for said identified product location coordinates as said determined product location.

6. The system for determining inventory location as claimed in claim 1 wherein said product location mechanism compares said shortest distance identified between said point of sale client location coordinates and said product location coordinates for a multiple-locational item with a shortest distance calculated between said product location coordinates of said multiple-locational item and product location coordinates of all other items being purchased by said customer to identify a product location coordinates for said multiple-locational item that are a shortest distance from an assumed path of said customer through said store.

7. The system for determining inventory location as claimed in claim 6 wherein said product location mechanism assigns as said determined product location a product location identifier for said product location coordinates identified as said shortest distance from said assumed path of said customer.

8. The system for determining inventory location as claimed in claim 1 wherein said database includes a dependent product field that associates the unique product identifier of a multiple-locational product with unique product identifiers of one or more products that are typically purchased by a customer along with said multiple-locational product.

9. The system for determining inventory location as claimed in claim 8 wherein said product location mechanism utilizes said dependent product field to determine if any items purchased by said customer are included as dependent products for a multiple-locational product item also being purchased by said customer.

10. The system for determining inventory location as claimed in claim 9 wherein said product location mechanism utilizes product location coordinates of said determined dependent products to calculate a distance between said product location coordinates of said determined dependent product and said primary product location coordinates and between said product location coordinates of said determined dependent product and secondary product location coordinates for each multiple-locational item being purchased by said customer and identifies a product location coordinates from said primary location coordinates and said any secondary product location coordinates that is a shortest distance from any product location coordinates of said determined dependent product.

11. The system for determining inventory location as claimed in claim 10 wherein said product location mechanism assigns a product location identifier for said identified product location coordinates as said determined product location.

12. The system for determining inventory location as claimed in claim 11 wherein said product location mechanism utilizes said point of sale client location coordinates to help determine said determined product location if said product location mechanism determines that no items purchased by said customer are included as dependent products for a multiple-locational product item also being purchased by said customer.

13. The system for determining inventory location as claimed in claim claim 12 wherein said product location mechanism compares said shortest distance identified between said point of sale client location coordinates and said product location coordinates for a multiple-locational item with a shortest distance calculated between said product location coordinates of said multiple-locational item and product location coordinates of all other items being purchased by said customer to identify a product location coordinates for said multiple-locational item that are a shortest distance from an assumed path of said customer through said store.

14. The system for determining inventory location as claimed in claim 13 wherein said product location mechanism assigns as said determined product location a product location identifier for said product location coordinates identified as said shortest distance from said assumed path of said customer.

15. The system for determining inventory location as claimed in claim 1 wherein said product location mechanism is included in or accessed by said point of sale client.

16. The system for determining inventory location as claimed in claim 1 wherein said product location mechanism is included in or accessed by a management system that is in communication with said point of sale client.

17. A method of determining inventory location comprising the steps of:
storing a unique product identifier associated with each of a plurality of products sold within a brick and mortar-type retail store in a database;
storing in said database in association with said product identifier associated with each product a primary product location within said store associated with each product, each primary product location including a unique location identifier and location coordinates;
storing in said database in association with said product identifier associated with a multiple locational product from said plurality of products at least one secondary product location associated with said multiple-locational product, said secondary product location including a unique location identifier and location coordinates;
storing in said database an inventory unit associated with each primary and secondary product location and stored in said database, wherein said inventory unit represents a quantity of items of a product at each product location;
obtaining from a point of sale client said product identifier from and a quantity of each of one or more items being purchased by a customer from said plurality of products at said store; and
utilizing a point of sale client location coordinates and said product identifier from said one or more items being purchased by said customer and calculating a distance between said point of sale client location coordinates and said primary product location coordinates and between said point of sale client location coordinates and any secondary product location coordinates associated with each item being purchased by said customer and identify a product location coordinates from said primary location coordinates and said any secondary product location coordinates that is a shortest distance from said point of sale client location coordinates, access said database and determine whether an item is a multiple-locational product utilizing said primary product location and any secondary product location associated with said item, if said item is a multiple-locational product, determining a most-likely product location from which said item was obtained by said customer from said primary and secondary product locations, and decrementing said inventory unit of said determined product location by a value equal to said quantity of said item obtained from said point of sale client, and if said item is not a multiple-locational product, decrementing said inventory unit of said primary product location by a value equal to said quantity of said item obtained from said point of sale client.

\* \* \* \* \*